March 27, 1962 A. A. TABIKH 3,027,456
X-RAY FLUORESCENT ANALYSIS SAMPLE PRESENTING MEANS
Filed Jan. 13, 1961 2 Sheets-Sheet 1
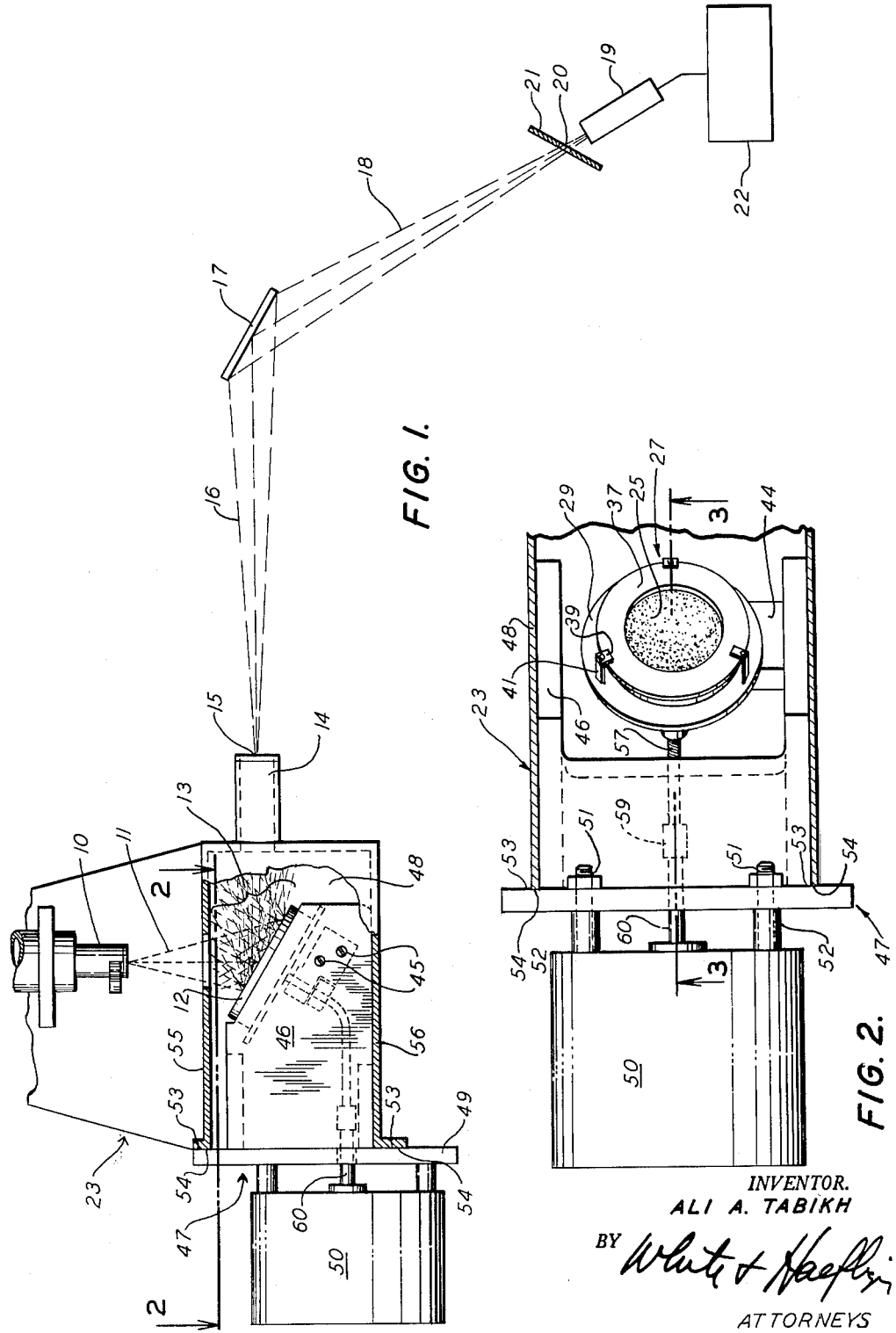
INVENTOR.
ALI A. TABIKH
BY White & Haefliger
ATTORNEYS March 27, 1962 A. A. TABIKH 3,027,456
X-RAY FLUORESCENT ANALYSIS SAMPLE PRESENTING MEANS
Filed Jan. 13, 1961 2 Sheets-Sheet 2

INVENTOR.
ALI A. TABIKH
BY
ATTORNEYS

United States Patent Office 3,027,456
Patented Mar. 27, 1962

3,027,456
X-RAY FLUORESCENT ANALYSIS SAMPLE PRESENTING MEANS
Ali A. Tabikh, Riverside, Calif., assignor to California Portland Cement Co., Los Angeles, Calif., a corporation of California
Filed Jan. 13, 1961, Ser. No. 82,439
10 Claims. (Cl. 250—51.5)

This invention relates generally to X-ray fluoroscopic or emission spectrographic analysis, and more particularly concerns improvements in apparatus for presenting successive samples of material to be analyzed, to incident X-rays, all in such manner as to identically locate the successive samples.

In my co-pending patent application entitled "X-ray Fluoroscopic Analysis," Serial No. 60,424, filed October 4, 1960, there is described a method for greatly enhancing the accuracy of quantitative analysis of samples characterized as having surface heterogeneity. The method contemplates that improved results may be obtained by or through the process of detecting a quantity of fluorescent radiation emitted from and leaving the specimen over an interval of time, while creating relative movement between the specimen and the path of radiation incident thereon during the detection time interval. The latter is made sufficient that the detection continues while the surface irregularities of the specimen are presented in many different orientations to the incident radiation, so that if the specimen is rotated during the detection time interval, the sum of all possible surface, or matrix geometric particle orientations will have been exhibited.

While improved results may be realized by rotating the sample in the path of incident X-rays, I have found that the comparative results as respects the analysis of successive samples may be optimized only if surfaces of the different samples are identically located for rotation in the path of incident X-rays. Accordingly, the present invention contemplates apparatus for achieving such identical location of successive sample surfaces during sample rotation in the path of incident X-rays, the invention taking into account the use of an environmental analysis chamber into which the successive samples are to be inserted for analysis. In its broader aspects, the invention contemplates the provision of carriage means movable relatively into the analysis chamber to insert a sample of material therein and to locate the carriage means in predetermined inserted position relative to the chamber, as well as support means on the carriage for locating the sample to be rotated in the path of incident X-rays with the sample surface in a plane having predetermined orientation relative to the carriage.

More specifically, the apparatus contemplated by the invention is useable in X-ray fluorescent anlysis wherein samples of compacted particulate material retained in sample holders are successively introduced into an environmental analysis chamber. Thus, the carriage is used to insert a sample holder into the environmental analysis chamber, the carriage and the chamber having interengageable shoulders for locating the carriage in predetermined inserted position relative to the chamber. Also, a rotary support on the carriage locates the sample holder for rotation in the path of incident X-rays, the support including yieldable means such as springs for urging a sample holder against an exactly located stop so that the holder and therefore the sample surface are brought into predetermined inserted location each time the carriage is fully inserted into the analysis chamber. In addition, the invention contemplates the provision of a rotary drive incorporated on the carriage for rotating the support about an axis normal to the plane of the sample surface.

These and other objects and advantages of the invention, as well as the details of illustrative embodiments thereof, will be more fully understood from the following detailed description of the drawings, in which:

FIG. 1 is a side elevation partly in section showing the carriage fully inserted into the environmental analysis chamber;

FIG. 2 is a section taken on line 2—2 of FIG. 1;

Figure 3:
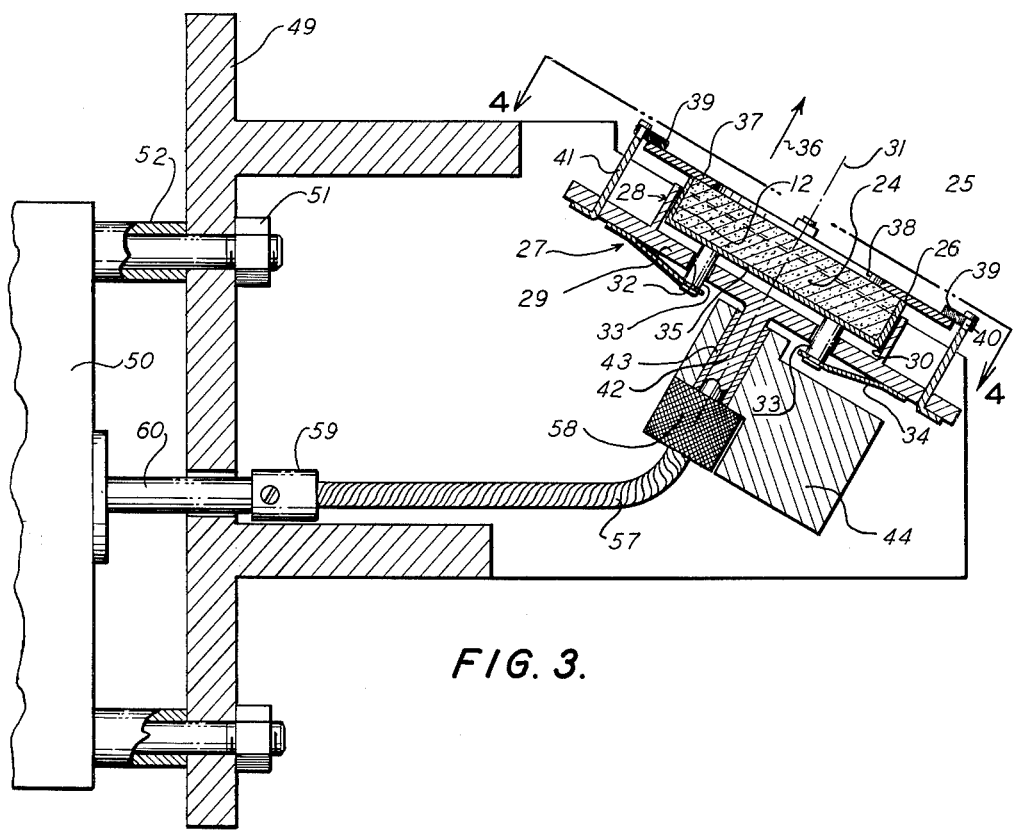
FIG. 3 is an enlarged section taken through the carriage and showing the details of the sample holder rotary support.
Figure 4:
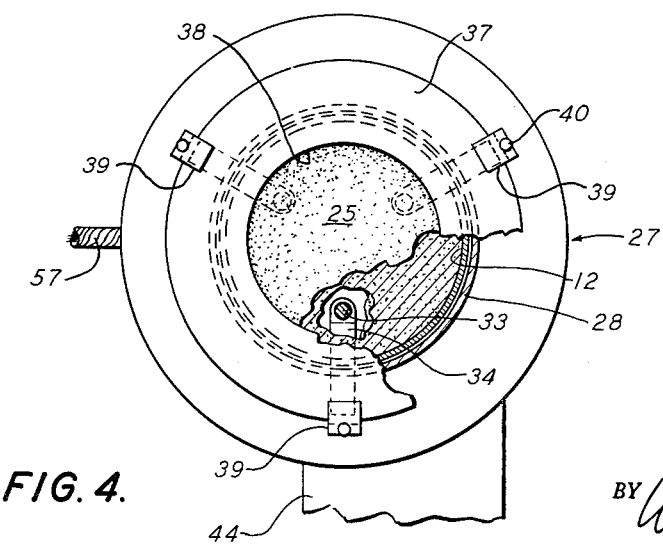
FIG. 4 is a view taken on line 4—4 of FIG. 1 and partly broken away.

Referring first to FIG. 1, the X-ray fluorescent analysis of samples is carried out through use of a primary X-ray tube generally shown at 10 with the primary X-rays from the tube being illustrated at 11 as striking the specimen or sample in a holder 12, for generating the characteristic fluorescent radiation 13 of the sample elements. These secondary fluorescent radiations are emitted from the specimen in random directions, and it is the function of a collimator 14 to pass only certain of these characteristic X-rays from a point or line source shown at 15, the rays passing through that source being indicated at 16. As explained in my co-pending application, the rays 16 strike the analyzing crystal 17, and for each angular setting of the latter only one wave length will be reflected as indicated at 18. Such reflected radiation is measured by a detector 19. Typically, the latter comprises a radiation counter tube such as a gas flow proportional counter tube receiving radiation through the slit 20 in the collimator 21. The total tube count is recorded by a suitable instrument 22, and accordingly if two different specimens or samples have lesser and greater concentration of a particular element such as calcium, the instrument will record lesser and greater radiation counts over equal counting intervals.

To minimize the adverse effects on the analysis due to the presence of air around the sample being subjected to radiation, the sample is rotated within an environmental analysis zone formed by a chamber 23. The latter may either be evacuated or filled with helium gas, after the evacuation of air. The samples to be analyzed during rotation thereof are characterized as comprising compacted powder material, the surface of which consists of heteropolymorphic crystalline and amorphous particles. Typically, the samples may comprise cement raw mix, Portland cement, rocks, soils and other materials containing elements of low atomic number (atomic No. 20 and below). These materials are composed of a number of minerals in various crystallographic forms and sizes as well as amorphous particles of differing shapes and finenesses. Accordingly, every time a sample of this type material is placed in the path of a primary X-ray beam it represents, at least microscopically or sub-microscopically, a specific surface geometric orientation. The latter is likely to change with successive removals and replacements of the sample, or during analysis of several samples of the same substance. In this regard, it has been found extremely important for improved accuracy of analysis where the sample is rotated, to locate identically the surfaces of successive samples during analysis.

For this purpose, the loose sample material is compacted into a holder 12 so that the compacted sample material 24 has an exposed surface 25 generally shown in FIG. 3 as extending in a flat plane and flush with the annular rim 26 of the holder. The plane of the surface 25 may be considered as predetermined as respects its location within the environmental analysis chamber 23 and it is the object of the invention to locate the surfaces of successive samples in that same plane during sample rotation.

Further as shown in FIG. 3, the sample holder 12 is shown as associated with support means generally indicated at 27, the latter typically including a circular receptacle 28 having a base 29 and a bore 30 into which the holder is inserted. The support 27 is furthermore shown as being generally coaxial with respect to the sample and holder, the common axis of these elements being indicated at 31, normal to the plane of the surface 25 and comprising the axis of rotation of the support and sample.

The support base 29 is shown as containing three openings 32 which are circularly spaced about the axis and through which three plungers 33 extend. The latter float within the openings 32 as limited by the leaf springs 34 attached to the outer ends of the plungers and also attached to the base 29, all in such manner as to resist plunger movement outwardly from the base. Accordingly, when the holder 12 is inserted within the bore 30, the base 35 of the holder depresses outwardly the plungers 33, which therefore tend to resist such insertion of the holder. At the same time, the holder is urged opposite the direction of insertion as indicated by the arrow 36, such urging being limited by the stop ring 37 which is engaged by the rim 26 of the holder. The latter ring may be made of brass or other material to shield the holder from X-rays incident upon the sample surface 25 through the aperture 38 in the shield ring 37. The ring 37 is in turn located by three arms 39 shown as pivoted at 40 to swing into overlapping relation with the ring 37, or alternately to swing away from that ring, freeing it for removal to permit removal of the sample holder from the support. Brackets 41 connected to the base 29 mount the pivoted arms 39, as illustrated.

Integral with the support base 29 is a drive shaft 42 received within a guide sleeve 43 coaxial with the axis 31, as is the shaft 42. The sleeve 43 is carried by a block 44 which is attached as by screws 45 to one of two side plates 46 of a carriage generally indicated at 47 in FIG. 2. The side plates 46 fit between the inner faces of the fixed panels 48 associated with the chamber 23, whereby the carriage 47 is constrained against sideward deviation during insertion thereof into the chamber. The carriage 47 also includes an end plate 49 suitably attached to the side plates 46, the plate 49 mounting a rotary drive such as an electric motor 50 connected to the plate as by suitable connectors 51 and spacers 52. Insertion of the carriage structure into the chamber 23 is limited by interengagement of shoulders 53 and 54 respectively on the plate 49 and on the panel structure of the chamber 23, including the side panels 48 and the top and bottom panels 55 and 56. Accordingly, when the carriage structure is fully inserted into the chamber 23, the carriage has predetermined position relative to the chamber. Also, since the sample holder support 27 has predetermined position on the carriage, the sample 24 is exactly located within the chamber 23, and specifically the exposed surfaces of successive samples are identically located in the plane 25 for rotation in the path of incident X-rays. If this were not the case, and the sample surfaces deviated slightly from the plane 25 during their rotation, the results of the analysis would be considerably altered, and moreover comparative results would be much less meaningful since the conditions of rotation of the sample surfaces would not be identical.

Finally, it will be observed in FIGS. 1 through 3 that rotation is transmitted from the electric motor 50 to a flexible cable 57, one end of which is connected with a coupling 58 to the support drive shaft 42. The opposite end of the cable 57 is connected by a coupling 59 to the motor drive shaft 60. Accordingly, the flexible cable transmits the motor drive to the support 27, the axis of rotation 31 of which is considerably angularly offset from the motor drive shaft axis.

I claim:
1. For use in X-ray fluorescent analysis wherein samples of material are successively introduced into an environmental analysis chamber, the improvement comprising carriage means movable relatively into said chamber to insert a sample of material therein and to locate the carriage means in predetermined inserted position relative to the chamber, and support means on the carriage means for locating the sample to be rotated in the path of incident X-rays with the sample surface in a predetermined plane relative to the carriage whereby the surfaces of successively inserted samples may be identically located for rotation in the path of incident X-rays, said support means including stop means and means for urging a sample in a direction of movement limited by the stop means.

2. For use in X-ray fluorescent analysis wherein samples of compacted particulate material are successively introduced into an environmental analysis chamber, the improvement comprising carriage means movable relatively into said chamber to insert a sample of compacted particulate material therein and to locate the carriage means in predetermined inserted position relative to the chamber, rotary support means on the carriage means for locating the sample to be rotated in the path of incident X-rays with the sample surface in a predetermined plane relative to the carriage whereby the surfaces of successively inserted samples may be identically located for rotation in the path of incident X-rays, and a rotary drive on the carriage for rotating said support means about an axis normal to said plane, said support means including stop means and means for urging a sample in a direction of movement limited by the stop means.

3. For use in X-ray fluorescent analysis wherein samples of compacted particulate material retained in sample holders are successively introduced into an environmental analysis chamber, the improvement which comprises carriage means movable relatively into said chamber to insert a sample holder therein and to locate the carriage means in predetermined inserted position relative to the chamber, rotary support means on the carriage means for locating the sample holder to be rotated with the sample surface in the path of incident X-rays and in a predetermined plane relative to the chamber whereby the surfaces of successively inserted samples may be identically located for rotation in the path of incident X-rays, said support means including stop means and means for yieldably urging a sample holder against said stop means, and a rotary drive on the carriage for rotating said support means about an axis normal to said plane.

4. The invention as defined in claim 3 in which said means for yieldably urging the sample holder includes a spring urged shoulder engageable with the sample holder and movable parallel to said axis.

5. The invention as defined in claim 3 in which said rotary drive includes an electric motor mounted on the carriage and a flexible drive shaft for transmitting rotation from the motor to said support means.

6. The invention as defined in claim 3 in which said stop means comprises a radiation shield for protecting the holder against direct impingement of X-rays thereon.

7. For use in X-ray fluorescent analysis, fixed structure including an environmental analysis chamber into which samples of compacted particulate material are successively introduced, carriage means movable relatively into said chamber to insert a sample of compacted particulate material therein, shoulders on said fixed structure and carriage means, said shoulders locating the carriage means in predetermined inserted position relative to the chamber, and support means on the carriage means for locating the sample to be rotated in the path of incident X-rays with the sample surface in a predetermined plane relative to the carriage whereby the surfaces of successively inserted samples may be identically located for rotation in the path of incident X-rays, said support means including stop means and means for urging a sample in a direction of movement limited by the stop means.

8. For use in X-ray fluorescent analysis, fixed structure including an environmental analysis chamber into which samples of compacted particulate material are successively introduced, carriage means movable relatively into said chamber to insert a sample holder therein, interengageable shoulders on said fixed structure and carriage means for locating the carriage means in predetermined inserted position relative to the chamber, rotary support means on the carriage means for locating the sample holder to be rotated with the sample surface in the path of incident X-rays and in a predetermined plane relative to the chamber whereby the surfaces of successively inserted samples may be identically located for rotation in the path of incident X-rays, said support means including stop means and means for yieldably urging a sample holder against said stop means, and a rotary drive on the carriage for rotating said support means about an axis normal to said plane.

9. The invention as defined in claim 8 including a cup-shaped sample holder having a rim engaged against said stop means, said means for urging the holder including springs spaced about said axis and spring urged shoulders engaging the base of the holder, said holder being urged generally coaxially relative to said axis.

10. The invention as defined in claim 9 in which said support means includes a rotary receptacle for said holder, and in which said stop means is movable over the open end of said receptacle to retain the holder therein.

References Cited in the file of this patent

UNITED STATES PATENTS

| | | |
|---|---|---|
| 2,500,926 | Boyd | Mar. 21, 1950 |
| 2,829,261 | Lowitzsch | Apr. 1, 1958 |
| 2,837,656 | Hendee et al. | June 3, 1958 |